United States Patent [19]
Pollinger et al.

[11] 3,948,360
[45] Apr. 6, 1976

[54] WEAR INDICATOR FOR DISK BRAKES ON A VEHICLE

[75] Inventors: Hans Pöllinger; Bernd Wosegien; Xaver Gmelch; Georg Freund, all of Munich; Ernst Blaut, Minden, all of Germany

[73] Assignee: Knorr-Bremse GmbH, Munich, Germany

[22] Filed: Nov. 18, 1974

[21] Appl. No.: 524,876

[30] Foreign Application Priority Data
Nov. 16, 1973 Germany............................ 2357207
Mar. 6, 1974 Germany............................ 2410706

[52] U.S. Cl................................................ 188/1 A
[51] Int. Cl.[2]........................................ F16D 66/02
[58] Field of Search ............. 188/1 A, 59; 200/61.4; 340/52 A

[56] References Cited
UNITED STATES PATENTS
3,768,598   10/1973   Pollinger et al..................... 188/1 A Primary Examiner—Duane A. Reger
Attorney, Agent, or Firm—Edmund M. Jaskiewicz

[57] ABSTRACT

A switching member positioned approximately in the plane of the brake disk has an actuating element therein which is displaceable radially with respect to the brake disk. The element is resiliently held in a rest position and is engageable by adjustable screws mounted on the ends of arms extending from the brake shoe suspension hangers pivotally mounted on each side of the brake disk. The extending arms are spaced with respect to each other in the peripheral direction of the brake disk. The switching member is connected to a fluid pressure source so that when a push button valve in the fluid pressure line is opened, the fluid pressure will be connected through the switching member to the atmosphere when the wear of the brake lining reaches a predetermined low level. The communication to the atmosphere is achieved by displacing the actuating member a sufficient distance so that a radial bore therein provides communication within the switching element between the source of fluid pressure and the atmosphere.

12 Claims, 6 Drawing Figures

WEAR INDICATOR FOR DISK BRAKES ON A VEHICLE

The present invention relates to a wear indicator for disk brakes, more particularly, to a system on a railway vehicle equipped with disk brakes wherein a warning signal is generated when a predetermined wear of the brake lining occurs.

One form of a wear indicator for brake linings on disk brakes employed an electrical contact which is closed on the brake disk when the brake lining is worn below a predetermined level and an optical signal is thus generated. Such indicators have the disadvantage that the contacts may be damaged or destroyed as a result of the high temperatures occurring during a full application of the brakes. There is the further disadvantage that the electrical contacts which of necessity are positioned in the vicinity of the brake lining may be soiled or damaged as a result of continued abrasion of the brake linings and dirt and may even become inoperative when covered with water which may freeze. Further, such indicators require a source of electric current which is available only in passenger cars or in self-driven railway cars or locomotives and is generally lacking on freight cars. Thus, such indicators have only a limited application and cannot be generally used.

Audio indicators have been provided wherein a small plate intended to produce a sound is mounted in an open retaining bore in the brake lining support such that the plate contacts the surface of the brake lining support which faces the brake lining. Such an indicator has the disadvantage that the open bore may be clogged with dirt and brake lining particles produced by abrasion after a relatively short time and thus any audio signal which may be generated and which is heard only during travel of the vehicle is drowned out by noises of the moving vehicle, more particularly in railway vehicles.

When such wear indicators become inoperative for any reason it is then necessary for railway personnel to visually inspect the brake linings under the railway vehicle which is a time consuming and expensive operation.

The German published specification 2,121,162 discloses a wear indicator which provides reliable and maintenance-free operation without time consuming and expensive activities of personnel. The indicator is acted upon from both sides and simultaneously. Two switching valves are arranged in a support positioned centrally with respect to the brake disk and the valves can be switched in opposite directions against the force of a compression spring and are provided with operating or push rods on their outer sides. These valves monitor the connection between a pipe which leads to a signal line and a pipe connection to a source of compressed air or to a duct opening which leads to the atmosphere. When at least one valve is actuated, the signal line is disconnected from the source of compressed air and is connected to the atmosphere.

This wear indicator will provide for testing of the condition of wear of the brake linings of disk brakes while the vehicle is in operation. However, each brake disk requires two such valves wherein two pistons are arranged axially within a cylinder. Further, a plurality of piston packings are required which must be carefully manufactured and the fabrication of the air lines in the valve block requires a complex mechanical operation which greatly increases the cost of manufacture and thus makes this indicator expensive.

It is therefore the principal object of the present invention to provide a novel and improved wear indicator for disk brakes of a vehicle.

It is a further object of the present invention to provide a wear indicator for disk brakes which is simple in structure but reliable in operation and is not susceptible to being inoperative because of freezing or accumulation of dirt or dust.

It is another object of the present invention to provide a wear indicator for disk brakes which is connected to a source of fluid pressure and to a indicator signal generator such that a signal is generated when a predetermined level of wear is reached and the source of fluid pressure is connected to the atmosphere.

It is an additional object of the present invention to provide such a wear indicator for disk brakes which is capable of more precisely indicating the wear level of disk brakes and is capable of reliable operation for long periods of operating life.

According to one aspect of the present invention a device for indicating wear of a brake lining on disk brakes of a vehicle may comprise control mechanism means positioned in substantially the plane of a brake disk for generating a signal when a predetermined wear of the brake lining occurs. The control mechanism has a spring biased actuating element therein which is movable in a radial direction with respect to the brake disk. There are pivotally mounted spring hangers on both sides of the brake disk and have brake shoes thereon which are engageable with the brake disk. Means extend from each of the suspension hangers and are spaced from each other in the peripheral direction of the brake disk for engaging the actuating element to displace the actuating element against the spring force.

The control mechanism may comprise a sensing valve and the actuating element may comprise a piston movable therein. A pipe including a restrictor extends from a source of compressed air and connects to the sensing valve. A push button control valve is provided in the pipe between the restrictor and the sensing valve so that when the push button valve is opened and the piston is displaced against the spring force a distance corresponding to the predetermined wear level, the piston will connect the line to the atmosphere and a visual or audio signal will be generated by an indicator connected to the sensing valve.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
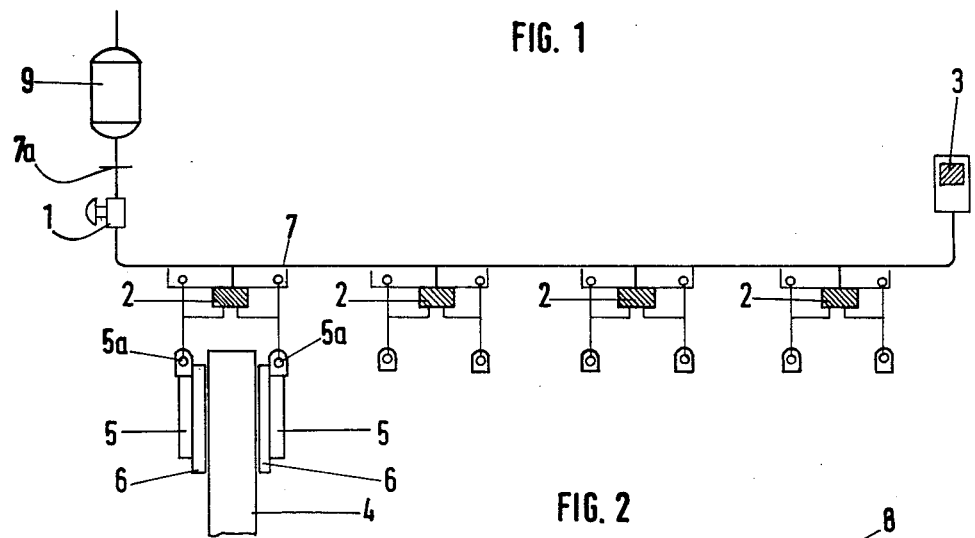
FIG. 1 is a schematic representation illustrating generally the wear indicator of the present invention.
Figure 2:
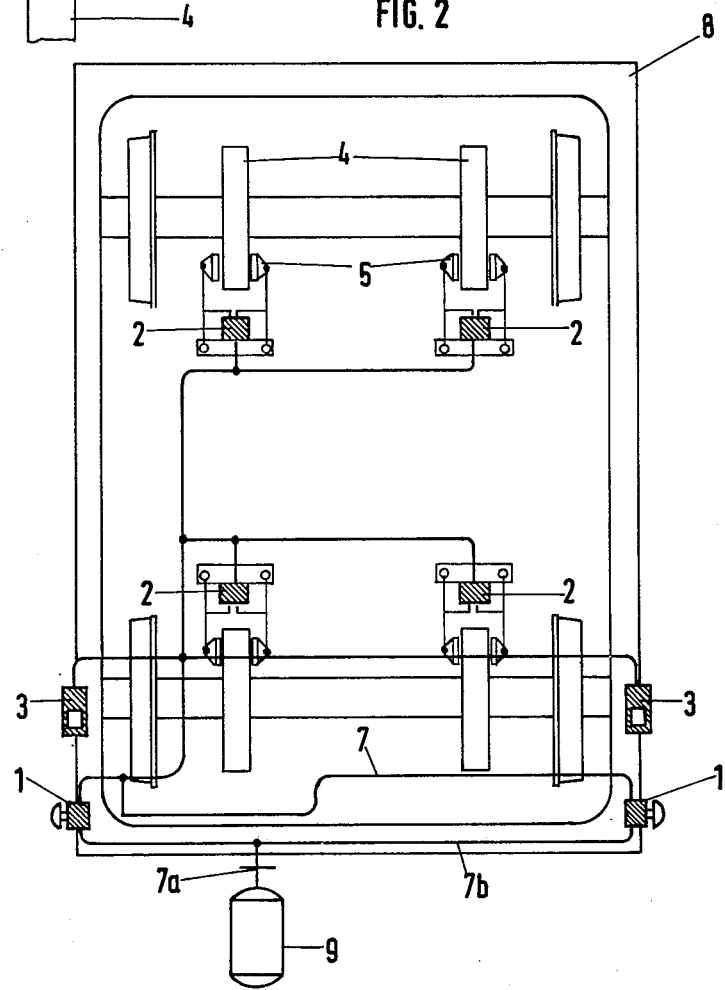
FIG. 2 is a plane view of a railway truck and showing schematically the incorporation in the truck of the wear indicator of the present invention.

With particular reference to FIGS. 1 and 2, each wheel of a vehicle, railway or motor, has associated therewith a brake disk 4 which is acted on both sides thereof by brake shoes 5 having brake linings 6. The brake shoes 5 are operated in a known manner and the details of this operating structure and of the accompanying brake rigging need not be described in further detail.

A sensing valve 2 is associated with each brake disk 4 and is connected into an air line 7 which is connected through a push button valve 1 and a restrictor 7a to a source of compressed air which may comprise a reservoir 9. The other end of air line 7 is connected to a single indicator 3.

In the embodiment shown in FIG. 2 a railway truck 8 comprises 4 wheels and correspondingly there are 4 brake disks and 4 sensing valves whose structure and operation will be presently described in greater detail. As further shown in FIG. 2, air is supplied through lines 7b to 2 push button valves 1 which are mounted on the longitudinal sides of the truck 8 so that operation of the wear indicator is possible from either side of the vehicle. The air pressure in line 7 is led pneumatically in parallel to each of the sensing valves 2 on truck 8. The indicator 3 is also mounted on a side of the truck 8 and is preferably closely adjacent to the push button valve 1 so that when a valve 1 is actuated any signal generated in the indicator 3 will be within the line of vision of the person operating the push button. The indicator 3 may comprise, for example, a cylinder having a viewing window therein that displays a figure or color when a piston attached thereto is or is not displaced by compressed air.

Figure 3:
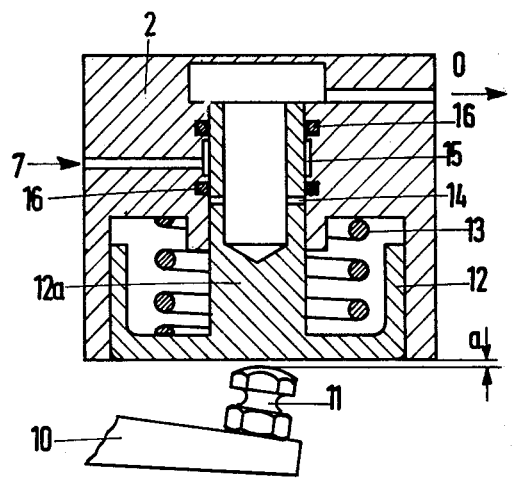
FIG. 3 is a longitudinal sectional view through the sensing valve used as the control mechanism in the wear indicator and showing the valve in its normal or rest position.
Figure 4:
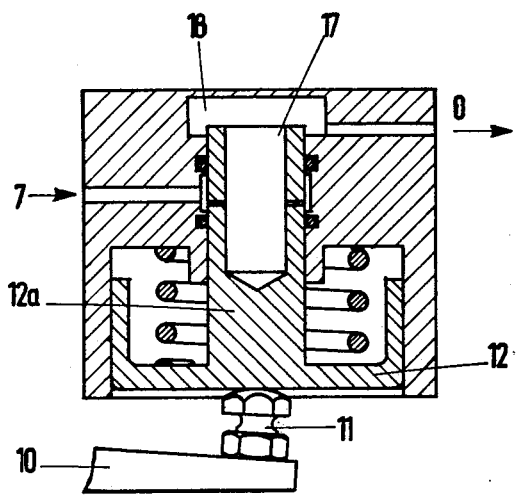
FIG. 4 is a view similar to that of FIG. 3 and showing the valve in position to indicate an excessive wear of the brake lining.
Figure 5:
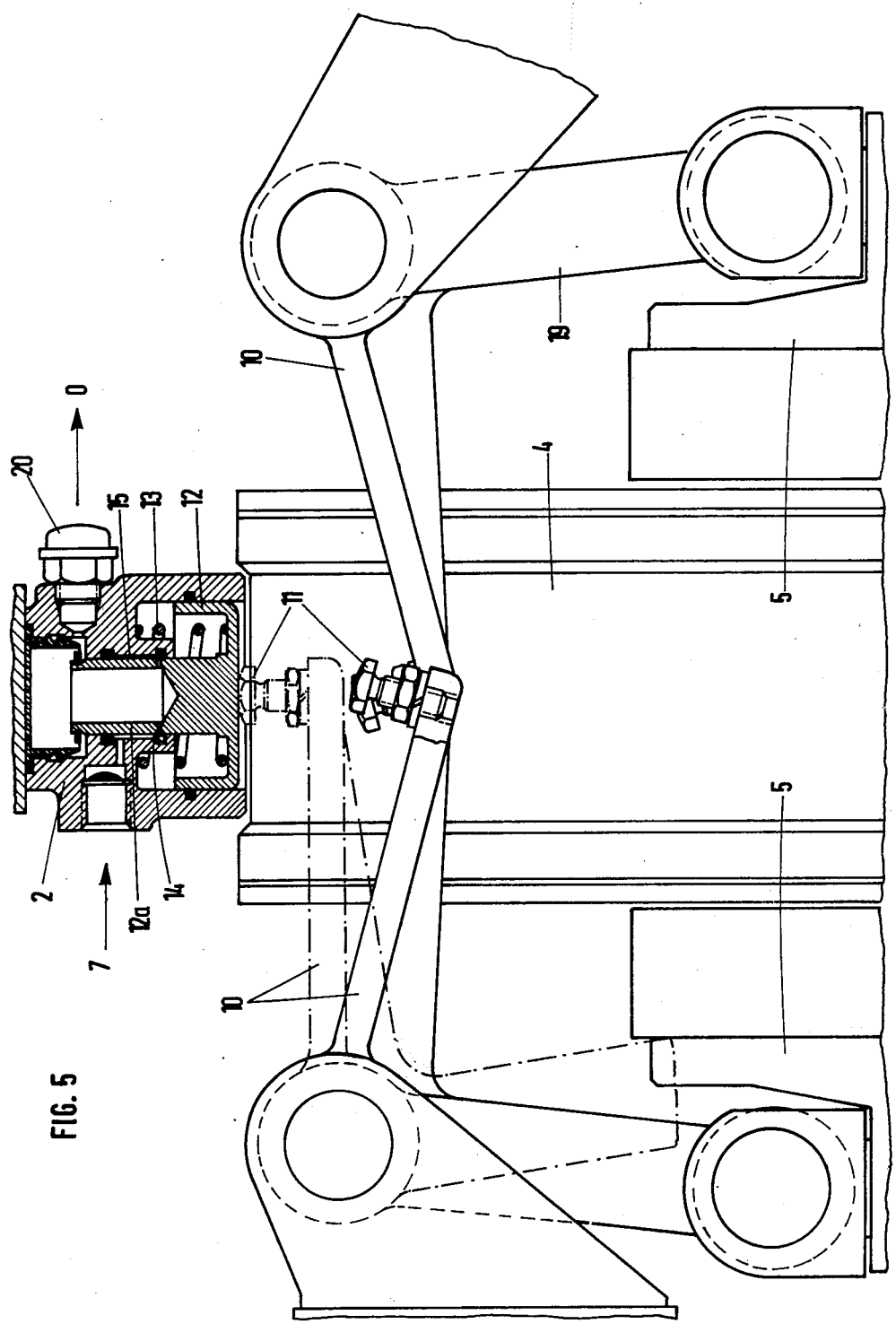
FIG. 5 is an elevational view showing the arrangement of the control valve with respect to the brake disk and the suspension hangers for the brake shoes with respect to the valve.

As shown in further detail in FIG. 5, the brake lining 6 on brake shoes 5 are displaced in a known manner by means of suspension hangers or side bars 19 which are pivotally mounted on both sides of the brake disk 4. According to the present invention, a single sensing valve 2 is arranged in the plane of its associated brake disk 4 and is spaced therefrom. The sensing valve 2 is actuated by means of extension arms 10 which project at substantially right angles from the respective hangers 19. As can be seen in FIG. 5, the arms 10 act on the same sensing valve 2 and are displaced with respect to each other in the peripheral direction of the brake disk 4. For purposes of clarity, only one such arm 10 is shown in FIGS. 3 and 4. An adjusting screw 11 is mounted on the outer end of each arm 10 and is the actual contact element against the sensing valve 2. The adjusting screw 11 provides for precise adjustment of the switching point for the sensing valve 2.

The valve 2 comprises a piston 12 which is displaceable therein in a direction radially with respect to its associated brake disk 4. A compression spring 13 within the valve 2 acts against the piston 12 to retain the piston in its lower or rest position. In this rest position, radial bores 14 are formed in a tubular extension of piston shaft 12a are separated from an annular chamber 15 formed within the valve 2 and surrounding the piston shaft tubular extension. The chamber 15 is connected through a passage to the air line 7 and is sealed on both sides thereof by means of circular packing rings 16 on the tubular extension. When the push button valve 1 is operated so as to open the line 7, compressed air from the line 7 will enter into the annular pressure chamber 15 but cannot pass off into the atmosphere through the passage in the valve 2 indicated at 0. As a result, the pressure in line 7 will be maintained and the pneumatic indicator 3 will indicate that the wear of the brake lining is within the permissible limits. In such a normal condition of wear, a clearance a will exist between the tip of adjusting screw 11 and the bottom piston 12 as shown in FIG. 3.

In FIG. 4 the components of sensing valve 2 are shown in their positions when the brake lining is worn below a predetermined level. As the wear on the lining 6 increases, the clearance a between piston 12 and adjusting screw 11 is a function of the wear of the lining and will be gradually reduced until screw 11 contacts the bottom of piston 12. As the wear of the brake lining progresses still further, the screw 11 on arm 10 will push piston 12 inwardly of the valve 2 against the force of spring 13 until, as shown in FIG. 4, radial bores 14 will finally communicate with the radial chamber 15. If the push button valve 1 is now pushed in order to inspect the state of wear of the lining, the air pressure from line 7 will enter into the annular chamber 15 and through radial bores 14 into a central bore 17 within the tubular extension of piston shaft 12a. The air will then pass into an equalization chamber 18 and then out into the atmosphere 0. As a result, pressure will not be built up in line 7 since the air will be discharged directly into the atmosphere and the indicator 3 will now display a signal indicating that the wear of the lining or a plurality of linings is below a predetermined level.

The structural components of a disk brake comprising the sensing valve of the present invention is shown in FIG. 5 wherein the brake disk 4 has brake lining 6 on both sides thereof retained in brake shoes 5. The brake shoes 5 are mounted on the vehicle frame or truck by means of the suspension hangers 19 which enable the brake shoes to be pressed against brake disk 4 by an actuating structure as known in the art with respect to disk brakes.

The extension arms 10 from the hangers 19 are shown in solid lines in the lower position in which they are normally disposed when the brake is not operated. The upper position of the arms 10 indicated by the discontinuous lines shows the position of the arms when the brake is applied. In this operating position, the adjusting screw 11 on extension arm 10 has pushed piston 12 upwardly against the force of spring 13 but the piston 12 has not been displaced sufficiently for air from line 7 to reach the atmosphere through annular chamber 15. A venting screw 20 is provided in the passage communicating with the atmosphere 0. It can be seen that in this position of the piston 12 the radial bores 14 in the piston shaft extension are not yet at the point where they communicate with annular chamber 15. Thus, when push button valve 1 is operated, the pressure in line 7 will be maintained and the indicator 3 will release a signal showing that the condition of wear of the brake lining is within permissible limits. As described above, the indicator 3 will release another signal only after the lining 6 has been worn beyond the permissible limit.

The inspection of the state of wear of the brake linings of the disk brakes can take place only when the brake is applied. When the valve 1 is operated for inspection, air will be admitted into the sensing valve 2 and will either be blocked at the valve if the lining has a sufficient thickness or will be discharged through the atmosphere when the wear of the lining is below a permissible level. When the air passage of the valve 2 is closed the pressure will increase in air line 7 and this pressure increase will act directly on an indicator 3 which is connected to the air line 7, preferably in parallel with the sensing valves 2. The indicator 3 will display in a known manner a visual sign which may read "linings in order." However, if a lining is worn below the permissible level the valve 2 will be opened and air from line 7 will flow into the atmosphere. Since the supply of compressed air is limited through restrictor 7a and the venting is not throttled, there will be no pressure increase in line 7 and the indicator 3 will remain stationary and may display a suitable signal such as "lining worn." Other forms of visual signals such as colors may be used in place of a text. In addition, audio signals may be released in place of such visual signals or may be released concurrently therewith.

It is to be born in mind that while the present embodiment has been described above as being pneumatically operated, the wear indicator will function in the same manner when a liquid operating medium is employed. When a liquid is used, the chamber 18 will not be connected to the atmosphere but to a return flow line for the liquid.

A major advantage of the indicator as disclosed above is that only a single sensing valve comprising a single piston is used for indicating the state of wear of a brake lining of a single disk brake. Dirt and brake lining particles will not adversely affect the operational capacity of the wear indicator since every movable part is enclosed. Further, the manufacture and servicing of the valve disclosed herein is less expensive and simpler than in other known wear indicators of the same general type. The necessity of making any complex bores in the valve block for guiding air is eliminated since the sensing valve does not receive any air supply in its normal state. The sensing valve is connected to the compressed air line only when inspection is carried out by pushing the push button valve. As a result, small leaks of the sensing valve will have little or no effect on the braking system.

Figure 6:
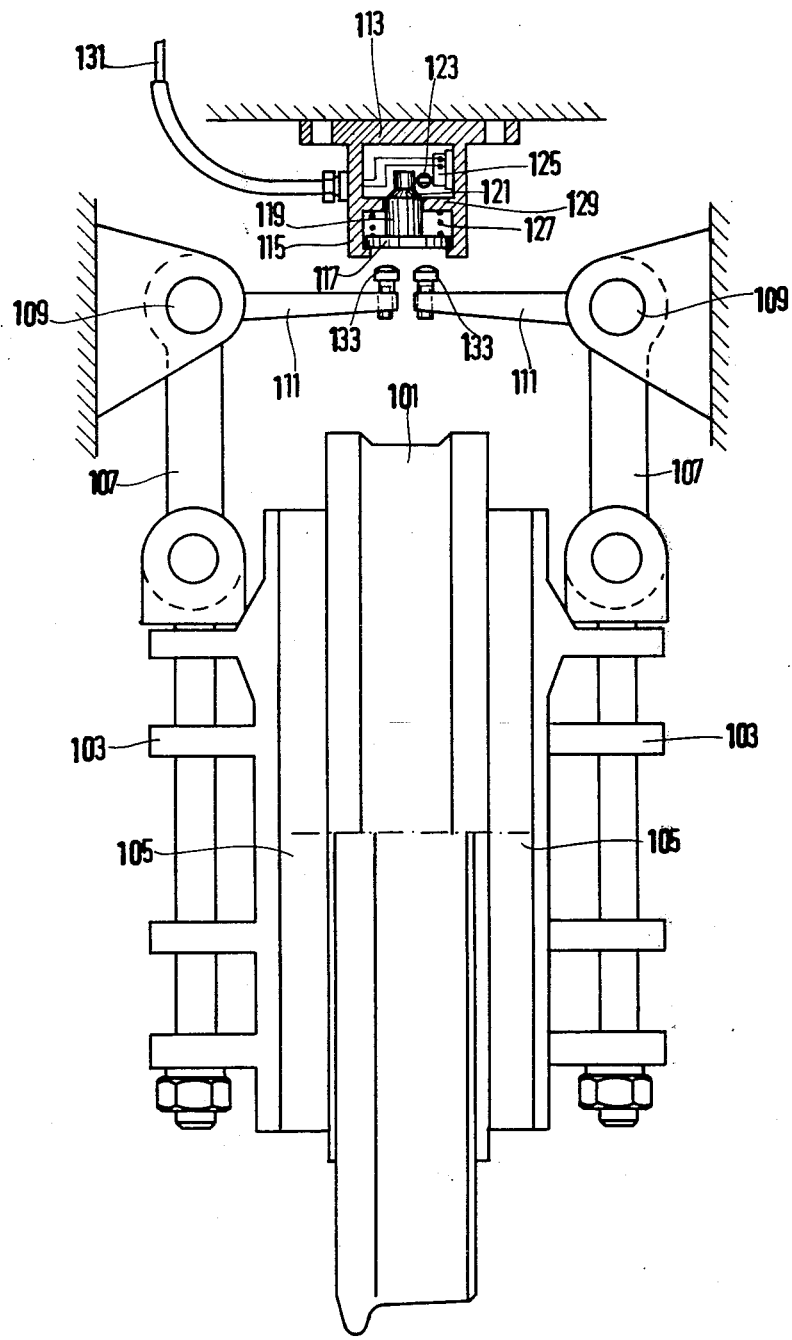
FIG. 6 is a view similar to that of FIG. 5 and showing a modification of the wear indicator.

The wear indicator of the present invention may also be constructed with a sensing switch as shown in the modification of FIG. 6. In this modification, a sensing switch 113 has a micro-switch 125 therein which is connected electrically through lead 131 to an indicator which is not shown. Each brake disk is associated with a sensing switch 113 that can be actuated by two operating arms 111 rigidly attached to suspension side bars 107.

In FIG. 6, there are also shown the known components of a disk brake including a brake disk 101, two brake shoes 103 each of which has a brake lining 105, and the suspension side bars 107 each of which is pivotally mounted on a pin 109. The ends of the extension arms 111 are each provided with adjustable screws 133 which are associated with the sensing switch 113. The sensing switch 113 has a housing 115 in which is displaceably located a piston 117 which is urged outwardly into its normal or rest position by a spring 127.

The piston 117 carries a switching pin 119 on the side toward the interior of the housing such that the pin is constructed as an axial extension of the piston and acts on an operating cam 123 of the micro-switch 125 by means of a conical inclined cam surface 121. The micro-switch 125 is preferably located within housing 115 so as to be protected against dirt and ice.

The operation of the modification of FIG. 6 is similar to the operation of the previously described embodiment of the invention. When the linings or a lining has been worn beyond a permissible level the screws 133 on the arms 111 will push the piston 117 upwardly a sufficient distance to actuate the micro-switch 125 which through the conductor 131 will cause a signal indicator to release an optical or acoustic signal to indicate that the wear is beyond the permissible limit. The electric circuit including conductor 131 connecting the indicator to the sensing switch 113 may also comprise a push button operating switch. This push button switch is operated when the brakes are applied in order to inspect the state of wear of the brake linings. In a similar manner, when the switch is pushed and the wear of the brake linings is within limits so that the micro-switch 125 is not closed a signal showing that the wear of the lining is within permissible limits will be shown or released at the indicator. When the wear of the brake lining exceeds a limit, switch 125 will be actuated and a corresponding signal will be released.

It will be understood that this invention is susceptible to modification in order to adapt it to different usages and conditions, and accordingly, it is desired to comprehend such modifications within this invention as may fall within the scope of appended claims.

What is claimed is:

1. In a device for indicating wear of a brake lining on disc brakes of a vehicle, the combination of control mechanism means positioned in substantially the plane of a brake disc for generating a signal when predetermined wear of the brake lining occurs, a spring biased actuating element in said control mechanism means and movable in a raidal direction with respect to said brake disc, pivotally mounted suspension hangers on both sides of the brake disc and having brake shoes thereon engageable with said brake disc, and arm means extending at substantially right angles from each of said suspension hangers and each of said arm means spaced from each other in the peripheral direction of the brake disc to engage said actuating element for displacing said actuating element in said radial direction against the spring force.

2. In a device as claimed in claim 1 wherein said control mechanism comprises a sensing valve and said actuating element comprises a piston displaceable therein, a line including a restrictor from a fluid pressure source and connected to said sensing valve, a push button valve in said line between said restrictor and said sensing valve, and means on said piston for opening said line to the atmosphere when said piston is displaced against the spring force a predetermined distance by said suspension hanger extending means and when said push button valve is opened whereby a signal is generated indicating wear of the brake lining below a predetermined level.

3. In a device as claimed in claim 1 and adjusting means on said suspension hanger arms means engageable with said actuating element whereby the clearance between said arms means and the actuating element corresponding to the permissible wear level can be set.

4. In a device as claimed in claim 3 wherein said sensing valve has a first passage connected to said fluid pressure line and a second passage communicating to the atmosphere, said piston having a radial bore therethrough such that upon actuation of the disk brake and when the wear of the brake lining is below a predetermined level the piston will be displaced against the spring force a sufficient distance to connect its radial bore with said first and second passages whereby the fluid pressure will be discharged into the atmosphere.

5. In a device as claimed in claim 2 and compression spring means exerting a spring force against said piston to maintain said piston in a rest position in which the pressure line is disconnected from the atmosphere.

6. In a device as claimed in claim 2 wherein the disk brakes are on a truck of a railway vehicle, signal indicator means connected to said control mechanism means, and a push button valve and a signal indicator means being mounted on each side of the truck.

7. In a device as claimed in claim 6 wherein said push button valve and indicator means on each side of the truck are in visual range of each other.

8. In a device as claimed in claim 6 wherein said signal indicator means generates one of a visual or audio signal.

9. In a device as claimed in claim 2 and a plurality of sensing valves corresponding to the plurality of brake disks and connected in parallel to said fluid pressure line.

10. In a device as claimed in claim 2 and a plurality of sensing valves corresponding to the plurality of brake disks and connected in series to said fluid pressure line.

11. In a device as claimed in claim 2 wherein said fluid pressure comprises one of compressed air or liquid as the operating medium.

12. In a device as claimed in claim 1 wherein said control mechanism means comprises a sensing switch having a housing and said actuating element comprises a piston displaceable in said housing in a direction radially to said brake disk, a micro-switch within said housing and operable by said piston, and signal indicator means connected electrically to said micro-switch whereby a signal is generated when the wear of the brake lining reaches a predetermined level.

* * * * *